Figure 1:
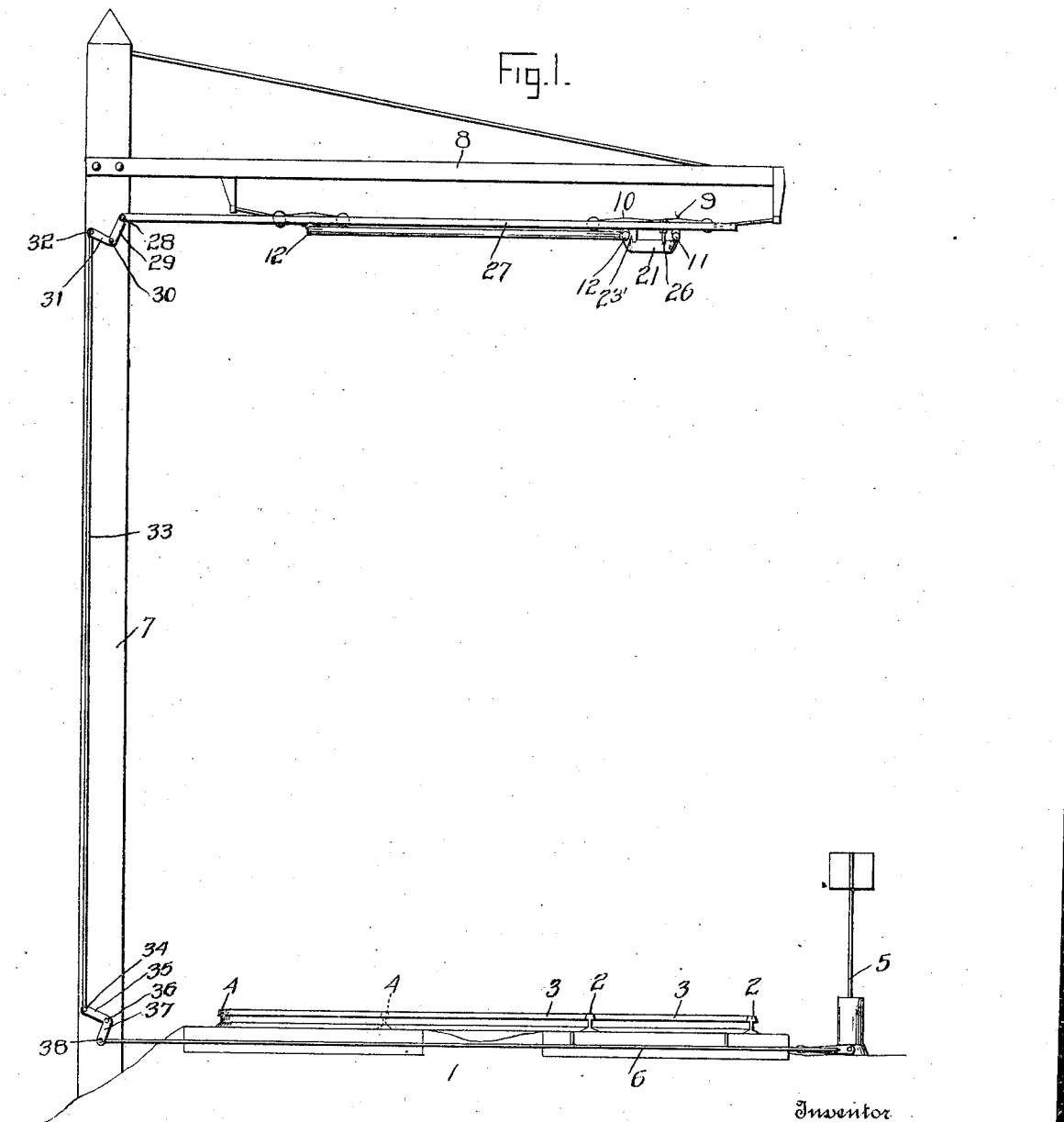

H. D. MURDOCK.
OVERHEAD TROLLEY.
APPLICATION FILED DEC. 29, 1909.

989,394.

Patented Apr. 11, 1911.
2 SHEETS—SHEET 1.

H. D. MURDOCK.
OVERHEAD TROLLEY.
APPLICATION FILED DEC. 29, 1909.

989,394.

Patented Apr. 11, 1911.

2 SHEETS—SHEET 2.

Witnesses
C. K. Reichenbach
N. Louis Bogan

Inventor
H. D. Murdock

By
H. C. Evrrs Co.
Attorney

THE NORRIS PETERS CO., WASHINGTON, D. C.

UNITED STATES PATENT OFFICE.

HENRY D. MURDOCK, OF SCOTTBURG, INDIANA.

OVERHEAD TROLLEY.

989,394. Specification of Letters Patent. Patented Apr. 11, 1911.

Application filed December 29, 1909. Serial No. 535,499.

*To all whom it may concern:*

Be it known that I, HENRY DELOS MURDOCK, a citizen of the United States of America, residing at Scottburg, in the county of Scott and State of Indiana, have invented certain new and useful Improvements in Overhead Trolleys, of which the following is a specification, reference being had therein to the accompanying drawing.

This invention relates to overhead trolleys and the object thereof is to provide an overhead trolley switch in a manner as hereinafter set forth and claimed which is particularly adapted for high speed trolley service and which is furthermore adapted to be operated simultaneously with the track switch for guiding the trolley wheel from the main line conductor to the branch or siding line conductor when occasion so requires.

In high speed trolley systems it is very desirable to keep the main line conductor absolutely clear of any attachment for the purpose of connecting up the switch to the siding or branch line conductor, as such attachments offer obstructions more or less to the trolley as it travels on the main line conductor and in some instances such attachments will deflect the trolley from or throw it off the main line conductor causing thereby delay in the travel of the car and inconvenience to the conductor as the trolley will have to be positioned properly after being deflected from the main line conductor.

To overcome the foregoing objection is the primary object of a trolley switch in accordance with this invention and such object is attained by coupling the trolley switch with the branch line or siding conductor so that the switch will be independent of the main line conductor, but is adapted to be moved in operative relation with respect to the main line conductor so that the trolley will readily ride off of the main line conductor on the switch and guided to the branch or siding conductor.

Further objects of the invention are to provide an overhead trolley switch which shall be simple in its construction and arrangement, strong, durable, efficient in its use, operating simultaneously with the track switch, quickly moved to operative position with respect to the main line conductor, conveniently positioned with respect to the branch or siding line conductor and inexpensive to set up.

With the foregoing and other objects in view, the invention consists of the novel construction, combination and arrangement of parts as hereinafter more specifically described and illustrated in the accompanying drawings wherein is shown one embodiment of the invention, but it is to be understood that changes, variations and modifications can be resorted to which come within the scope of the claims hereunto appended.

Figure 2:
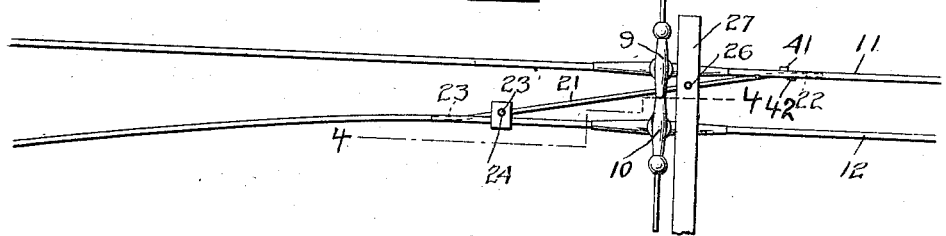
Figure 3:
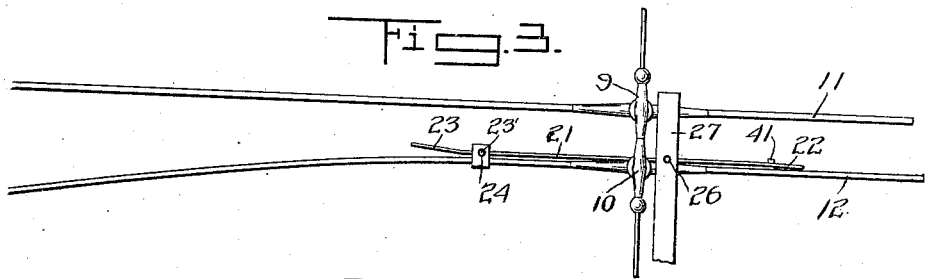
Figure 4:
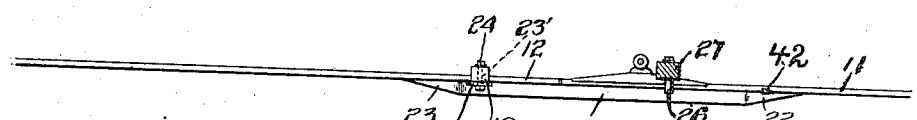
Figure 5:
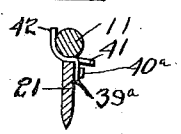
Figure 6:
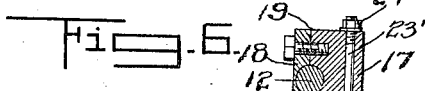
Figure 7:
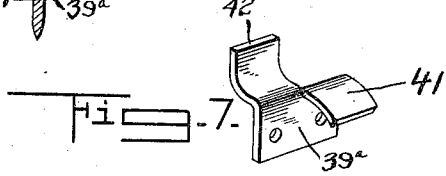

In the drawings wherein like reference characters denote corresponding parts throughout the several views, Figure 1 is a transverse sectional elevation of a trolley road showing the adaptation of an overhead trolley switch in accordance with this invention. Fig. 2 is a plan with the switch closed. Fig. 3 is a like view with the switch open. Fig. 4 is a side elevation partly in section taken upon line 4—4 of Fig. 2, and showing the adaptation of the switch member with respect to the branch line or siding conductor. Fig. 5 is a sectional detail showing the arrangement of the switch member with respect to the main line conductor when the member is shifted to operative position. Fig. 6 is a sectional detail showing the connection between the switch member and the branch line or siding conductor, and, Fig. 7 is a perspective view of the combined guide and stop for the free end of the switch member.

Referring to the drawings, 1 denotes a track bed provided with the rails 2 constituting the main line and also having the switch rails 3 for transferring the car to the siding or branch line formed by the rails 4.

The reference character 5 denotes a switch stand operatively-connected with the switch rails 3 and which also has connected thereto an actuating bar 6 operated simultaneously when the track switch is actuated.

The reference character 7 denotes a pole provided with a supporting arm 8 carrying the hangers 9 and 10, the former suspends the main line conductor 11 and the latter the branch or siding line conductor 12.

The foregoing elements are of known construction and arrangement and are illustrated so as to show the adaptation of an overhead trolley switch in accordance with this invention with respect to the conductors 11 and 12.

An overhead trolley switch in accordance with this invention comprises a switch member 21 consisting of a bar having an elongated intermediate portion and a pair of inclined end portions as at 22, 23. Each of the end portions are angularly-disposed with respect to the intermediate portion. The inclined end portions extend in opposite directions with respect to each other but in parallel planes. When the switch member is in operative position, the intermediate portion thereof is disposed diagonally with respect to the conductors 11 and 12 and is of a length as to extend from the conductor 11 to the conductor 12 and with the inclined end portion 22 below and in parallelism with the conductor 11 and with the inclined end portion 23 below and in parallelism with the conductor 12. Each of the inclined end portions 22, 23 has its lower edge beveled to facilitate the trolley riding off of the conductor 11 on to the intermediate portion of the switch member and to facilitate the passage of the trolley off of the intermediate portion onto the conductor 12. The intermediate portion of the member 21 in proximity to that end 23 which associates with the conductor 12 has the lower end of a vertically-disposed pivot bar 23' connected thereto by the hold-fast devices 19. The bar 23' loosely extends through a block 17 carried by a bracket 18 which is clamped to the conductor 12. The member 21 is formed with a recess 20 in which extends the lower end of the block 17, the width of the recess 20 is such as to provide sufficient clearance for the member when the pivoted end thereof is shifted. The upper end of the bar 23' is provided with a nut 24 which prevents the lowering movement of said bar. By setting up the switch member 21 in the manner as stated, it is pivotally connected with the branch or siding line conductor 12. The switch member 21 in proximity to that end which is moved in parallelism with respect to the main line conductor 11 is connected by the hold-fast device 26 to a reciprocatory operating rod 27 which moves transversely with respect to the track bed and is supported upon the hangers 9 and 10.

The rod 27 is pivotally-connected at one end as at 28 to the arm 29 of a bell crank lever, the latter being pivoted as at 30 to the pole 7 and has its other arm 31 pivotally connected as at 32 to the upper end of the vertically-disposed shift rod 33, the latter being pivotally connected at its lower end as at 34 to one arm 35 of a bell crank lever, the latter being pivotally connected as at 36 to the pole 7 and has its other arm 37 pivotally-connected as at 38 to the inner end of the actuating bar 6. The operating rod 27 is adapted when moved in one direction to position the end 22 of the member 21 under the main line conductor 11 and in parallelism therewith so that the trolley will ride off the main line conductor 11 and on to the member 21 whereby the trolley will be directed on to the branch line conductor 12.

When the end 22 of the member 21 is shifted in the manner as stated, the end 23 of the said member 21 is shifted to a position underneath the branch line conductor 12 and in parallelism therewith, the bar 23' pivoting in the sleeve 17. The positioning of the member 21 in the manner as stated is had simultaneously with the throwing of the track switch as is obvious, owing to the fact that the mechanism which moves the rod 27 is coupled up with the switch stand 5 and is thrown into operation simultaneously with the operation of the switch. When the track switch is shifted to open position the rod 27 is moved in the opposite direction and the end 22 of the switch member 21 is moved clear of the main line conductor 11 whereby the latter will be clear of any obstructions.

The switch member 21 is provided with a stop to arrest the lateral movement of the end 22 of the member 21 with respect to the conductor 11 and to furthermore prevent vertical movement of the end 22 of the member 21 with respect to the conductor 11, and under such conditions, the end 22 of the member 21 is properly positioned with respect to the conductor 11. The stop consists of a body-portion 39$^a$ which is secured by the hold-fast devices 40$^a$ to the outer side of the member 21 at the end 22 of said member and projecting inwardly from the top of said body-portion is a substantially L-shaped arm 42 which is of a height as to extend parallel with the plane of the conductor 11 and which is also adapted to engage under and at one side of the conductor 11 as clearly shown in Fig. 5 and which prevents the end 22 of the member 21 from being moved beyond the plane of the conductor 11. The lower portion of the arm 42 prevents the member 21 from vertical movement with respect to the conductor 11 while the upper portion of the arm 42 prevents lateral movement in outward directions of the member 21 with respect to the conductor 11 after the arm 42 is in the position as shown in Fig. 5. To further prevent upward movement of the member 21 with respect to the conductor 11, the body-portion 39$^a$ is provided with a laterally-extending arm 41 which projects in an opposite direction with respect to the arm 42 to prevent vertical movement of the end 22 of the member 21.

What I claim is:

1. In combination in an overhead trolley switch, a switch line conductor, a main line conductor, a switch member arranged below the planes of said conductors and independent of the main line conductor, and having inclined end portions arranged below the planes of the conductors, means for pivotally connecting the switch member to the switch line conductor, and means connected to said member and adapted when operated to shift the switch member to position the inclined end portions thereof in parallelism with respect to the switch line and main line conductors.

2. In combination in an overhead trolley switch, a switch line conductor, a main line conductor, a switch member of a length as to extend from the main line conductor to the switch line conductor and independent of the main line conductor and located wholly in a plane below said conductors, means for pivotally connecting said switch member to the switch line conductor, means connected to the switch member and adapted when operated to move the switch member to a position in operative relation with respect to the switch and main line conductors, and means carried by the switch member and adapted when said member is moved to a position in operative relation with respect to the main line conductor for stopping said member in such position.

3. In an overhead trolley switch, a switch line conductor and a main line conductor, a switch member located below said conductors, means for pivotally-connecting said switch member to said switch line conductor, means connected to said switch member and operated simultaneously with the operation of the track switch for moving said switch member to a position in close proximity to said switch line and main line conductors whereby a trolley is deflected, and means carried by the switch member and adapted when said member is moved to close proximity to said switch line to stop it in such position.

4. In combination in an overhead trolley switch, a switch line conductor, a main line conductor, a switch member arranged below the planes of said conductors and independent of the main line conductor, means for pivotally-connecting the switch member to the switch line conductor, and a rod movable transversely with respect to the main line conductor and connected with said member for shifting it to a position below and in close proximity to said conductors whereby a trolley is deflected from the main line conductor on to the switch line.

5. In combination in an overhead trolley switch, a switch line conductor, a main line conductor, a switch member arranged below the planes of said conductors and independent of the main line conductor, means for pivotally-connecting the switch member to the switch line conductor, a rod movable transversely with respect to the main line conductor and connected with said member for shifting it to a position below and in close proximity to said conductors whereby a trolley is deflected from the main line conductor on to the switch line, and means carried by said member and adapted to engage the main line conductor to prevent vertical and outward movement of the member when the latter is shifted to said position.

In testimony whereof I affix my signature in the presence of two witnesses.

H. D. MURDOCK.

Witnesses:
CHAS. E. GUERNSEY,
MARK STOREN.

Copies of this patent may be obtained for five cents each, by addressing the "Commissioner of Patents, Washington, D. C."